United States Patent Office 3,437,658
Patented Apr. 8, 1969

3,437,658
STEROIDAL [16,17-c]-[1',2',5']OXADIAZOLES AND METHODS FOR THEIR MANUFACTURE
Hans Reimann, Wayne, N.J., assignor to Schering Corporation, Bloomfield, N.J., a corporation of New Jersey
No Drawing. Filed Nov. 25, 1966, Ser. No. 596,747
Int. Cl. C07c 173/00; A61k 17/00
U.S. Cl. 260—239.55                      8 Claims

ABSTRACT OF THE DISCLOSURE

Novel [16,17-c][1',2',5']oxadiazole-N-oxide derivatives of steroids of the androstane and estrane series are prepared by reacting a 16,17-oximino steroid of the androstane and estrane series with a reagent selected from the group consisting of nitrous acid generated in situ, an alkaline earth metal hypohalite, and an alkali metal hypohalite. Treatment of the thereby produced isomeric mixture of [16,17-c]furoxan derivatives with a tri-lower alkyl phosphite yields novel [16,17-c][1',2',5']oxadiazole derivatives of steroids of the androstane and estrane series. The 1,3,5(10) - estratrieno-[16,17-c][1',2',5']oxadiazoles and the N-oxide derivatives thereof are useful as estrogenic agents; the 3-keto-androstano- and 3-hydroxy-androstano [16,17-c][1',2',5']oxadiazoles, the corresponding estrane analogs, the unsaturated analogs thereof as well as the N-oxide derivatives of the foregoing possess anabolic/androgenic activity.

---

This invention relates to compositions of matter classified as [16,17-c][1',2',5']oxadiazole derivatives of steroids of the androstane and estrane series, to methods for their manufacture and to intermediates produced thereby.

The invention sought to be patented in its composition aspect is described as residing in the concept of a molecular structure in which the 16 and 17 positions of the nucleus of steroids of the androstane and estrane series are fused to the 3' and 4' positions of a furazan ring (i.e. of a 1',2',5'-oxadiazole nucleus) or to the 3' and 4' positions of a furoxan ring (i.e. of a 1',2',5'-oxadiazole-N-oxide nucleus) thus forming [16,17-c][1',2',5']oxadiazole derivatives and [16,17-c][1',2',5']oxadiazole-N-oxide derivatives of steroids of the androstane and estrane series, respectively; said derivatives being further characterized by having an oxygen function at C–3 selected from the group consisting of ketonic oxygen, hydroxy, lower alkoxy, and hydrocarbon carbonyloxy having up to eight carbon atoms.

The invention sought to be patented in its process aspect is described as residing in the concept of reacting a 16,17-bis-oximino steroid of the androstane and estrane series with a reagent selected from the group consisting of an alkaline earth metal hypohalite, an alkali metal hypohalite (preferably sodium hypochlorite) and nitrous acid generated in situ, for example by using sodium nitrite in acetic acid, whereby is produced in isomeric mixture of [16,17-c]furoxan derivatives, i.e. of [16,17-c][1',2',5'] oxadiazole-2'-N-oxide and [16,17-c][1',2',5']oxadiazole-5'-N-oxide derivatives of steroids of the androstane and estrane series; and treating said isomeric 16,17-c]furoxan derivatives with a tri-lower alkyl phosphite, e.g. triethylphosphite, whereby are produced [16,17-c]furazan derivatives, i.e. [16,17-c][1',2',5']oxadiazole derivatives of steroids of the androstane and estrane series.

The invention sought to be patented in its composition aspect may be described as including compounds having minimally the following structural Formulae I and II:

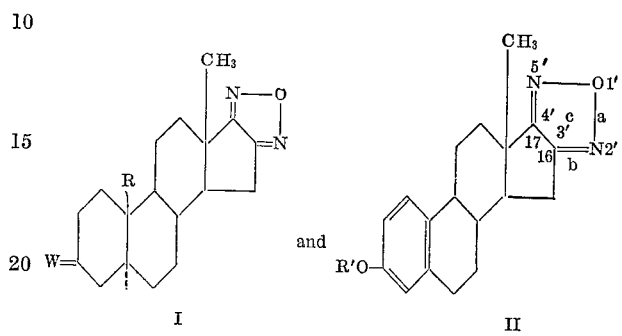

wherein R is a member selected from the group consisting of hydrogen and methyl; W is a member selected from the group consisting of oxygen and (H,βOY), Y being a member selected from the group consisting of hydrogen and hydrocarbon carbonyl having up to eight carbon atoms; and R' is a member selected from the group consisting of hydrogen, lower alkyl, and hydrocarbon carbonyl having up to eight carbon atoms; and when W is oxygen, the 4-dehydro and 4,6-bis-dehydro-analogs of Formula I; and when W is oxygen and R is methyl, the 1,4-bis-dehydro- and 1,4,6-tris-dehydro-analogs of Formula I; and when W is (H,βOY), the 5-dehydro analogs of Formula I; and the [17,17a-c][1',2',5']D-homo-analogs of the compounds of Formulae I and II and of the foregoing derivatives thereof; and the N-oxide derivatives of Formulae I and II and of the foregoing derivatives and homologs thereof.

Representative of the hydrocarbon carbonyl groups contemplated at C–3 as depicted by Y, are lower alkanoyl such as acetyl, propionyl, caproyl, capryloyl, propargoyl, acryloyl, cyclopentylacetyl, and the like, as well as aromatic carbonyl groups such as benzoyl and methyl homologs thereof, e.g. o-, m-, and p-toluyl.

By lower alkyl, as representative of R', are contemplated hydrocarbon radicals having up to 4 carbon atoms such as methyl, ethyl, n- and iso-propyl, n-, iso- and tert.-butyl and the like, of which methyl is preferred.

The foregoing formulae delineations are requisite in order for the composition of matter to fall within the scope of my concept. Other substitutents may be present. For example, a methyl group may be present at the 1, 6 or 7 positions, an oxygen function such as keto or hydroxy may be present at the 11-position, and halogen may be present at one or more of positions 4, 6, 9, 11, and double bonds other than those set forth above may be present such as a 9(11)-dehydro bond. The only limiting features of my concept insofar as it pertains to compositions of matter are those set forth above; that is, my novel compounds [16,17-c][1',2',5'] oxadiazole and [16,17-c] [1',2',5] oxadiazole-N-oxide derivatives of steroids of the androstane and estrane series having an oxygen function at C–3 and having A and B rings which may be saturated or contain unsaturations. My concept thus includes [16,17-c][1',2',5']-oxadiazole-N-oxides of 3-keto-androstanes (Formula I, W is oxygen, R is methyl)- 3-keto-estranes (Formula I, W is oxygen, R is hydrogen), 3-hydroxy-androstanes (Formula I, W is H,βOH, R is methyl), 3-hydroxy-estranes (Formula I, W is H,βOH, R is hydrogen) and 3-esters thereof, 3-hydroxy-1,3,5(10)-estratrienes and the 3-ether and 3-ester derivatives thereof (Formula II), 3-keto-4-androstenes, 3-keto-1,4-androstadienes, 3-keto-4-estrenes, 3-hydroxy-5-androstenes, 3-hydroxy-5-estrenes and esters thereof as well as the D-homo[17, 17a-c][1',2',5'] oxadiazole and the D-homo-[17,17a-c][1',2',5'] oxadiazole-N-oxide analogs thereof.

As disclosed hereinabove, the [16,17-c][1',2',5']-oxadiazole-N-oxide derivatives of this invention, i.e. the 16,17-furoxans, are produced as an isomeric mixture of the 2'-N-oxide and the 5'-N-oxide derivatives of the compounds defined minimally by structural Formulae I and II. The structural formulae of the [16,17-c][1',2',5']-oxadiazole-N-oxide nucleus of each of these isomers are as follows:

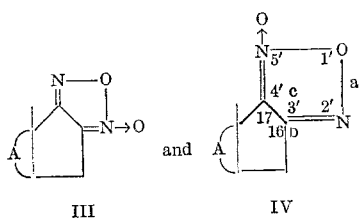

wherein A represents the steroidal A, B, and C-rings as defined by Formulae I and II.

The oxadiazole (furazan) derivatives defined by Formulae I and II and the oxadiazole-N-oxide (furoxan) derivatives defined by Formulae III and IV are named in accordance with standard rules of nomenclature, the numbering thereof being indicated in above Formulae IV wherein the bond between the 1' and 2' positions is identified as the "a" bond and that between the 2' and 3' positions as the "b" bond, etc. Thus, in the compound names, the [16,17-c] indicates that the bond between the 16 and 17 positions of the steroidal D-ring is also the "c" (or 3',4') bond in the oxadiazole ring; and the [1',2',5'] indicates the respective positions of the oxygen and the two nitrogens in the ring. Similarly, in the D-homo-analogs, [17,17a-c] indicates that the bond between the 17 and 17a carbon atoms is also the "c" bond in the oxadiazole nucleus.

In this specification and in the claims, when the name of a furoxan (i.e. oxadiazole-N-oxide) derivative of a compound of Formulae I and II does not specify the position of the oxide function, both the 2'-N-oxide and 5'-N-oxide are implicitly included thereby. Thus, the compound name 3β-hydroxy - 5 - androsteno[16,17-c]-[1',2',5']oxadiazole-N-oxide inherently includes both the 2'-N-oxide isomer of Formulae III, and the 5'-N-oxide isomer of Formula IV.

Representative of the preferred compounds of the composition aspect of my invention are the N-oxide (furoxans) derivatives of the compounds defined by Formulae I and II since, in addition to being therapeutically active per se, they also serve as intermediates in the preparation of the furazans (i.e. 1',2',5'-oxadiazoles) of Formula I which are also therapeutically active. Of the preferred [1',2'5']oxadiazole-N - oxido - androstanes and estranes, those of particular interest are 3-keto-4-androsteno[16,17-c][1',2',5']oxadiazole-N-oxide, 3β-hydroxy-5-androsteno[16,17-c][1',2',5']oxadiazole-N-oxide and 3-methoxy - 1,3,5(10) - estratrieno[16,17 - c][1',2',5']oxadiazole-N-oxide.

The process aspect of this invention comprises two steps, the first of which produces the [16,17-c]furoxans of this invention (i.e. an isomeric mixture of compounds of Formulae III and IV), the second of which (utilizing the furoxans of step one as intermediates) produces the [16,17-c]furazans of this invention (i.e. compounds of Formulae I and II).

The physical embodiments of the process aspects of this invention are thus made via a two-step synthesis wherein a 16,17-bis-oxamino-androstane or a 16,17-bis-oximino-estrane is treated with an oxidizing reagent, e.g. an alkaline earth metal hypohalite (e.g. sodium hypochlorite) or an alkali metal hypohalite (e.g. sodium hypochlorite, potassium hypochlorite and lithium hypochlorite) or with nitrous acid prepared in situ (preferably by the action of sodium nitrite in acetic acid) whereby are produced the androstano- or estrano[16,17-c][1',2',5']-oxadiazole-N-oxides ([16,17-c]furoxans) of this invention, which in turn, are then reduced with triethylphosphite whereby are formed the androstano- or estrano-[16,17-c][1',2',5']oxadiazoles ([16,17-c]furazans) of my invention.

The first step of my process (whereby is effected ring closure of the vicinal bis-oximino groups to a furoxan ring) is effected either by means of a hypohalite salt in the presence of alkali or with nitrous acid at low temperatures in a solvent which does not interfere with the reaction. Temperatures utilized may be in the range of −20° to +15° C., and preferably in the range of −5° C. to +5° C. when the reagent is a hypohalite salt, e.g. sodium hypochlorite. Solvents which may be used are such as water, alcohols (preferably lower alkanols), glycols, and mixtures thereof and the alkali preferably used is an alkali hydroxide such as sodium hydroxide. When the reagent is nitrous acid (prepared in situ by the action of an acid, e.g. a lower alkanoic acid, on sodium nitrite) an excess of the lower alkanoic acid may serve as the solvent in the presence of water if desired.

Of particular importance in the first step of the process aspect of this invention is the concept of effective ring closure of vicinal bis-oximino groups to form a furoxan ring by the action of nitrous acid, which concept heretofore has been unknown.

The second step of my process (whereby the oxadiazole-N-oxide nucleus is reduced to form an oxadiazole nucleus) is preferably effected at elevated temperatures usually in the range of 170–180° C. with the reagent, triethylphosphite, conveniently serving as solvent or suspending medium. The reaction is preferably carried out under an atmosphere of an inert gas such as argon and nitrogen.

In a preferred mode of my process, a solution of 16,17-bis-oximino-5-androsten-3β-ol and sodium hydroxide in aqueous ethanol at about 0°–5° C. is treated with an aqueous solution of sodium hypochlorite for about one to three hours and the 3β-hydroxy-5-androsteno[16,17-c][1',2',5']oxadiazole-N-oxide thereby formed separates as a solid, is removed by filtration, and purified by crystallization from acetone/hexane. The 3β-hydroxy-5-androsteno[16,17-c][1',2',5']oxadiazole-N - oxide thereby produced is a mixture of the 2'-N-oxide and the 5'-N-oxide isomers as evidenced by nuclear magnetic resonance data.

The 3β-hydroxy-5-androsteno[16,17-c][1',2',5']oxadiazole-N-oxide is then suspended in triethylphosphite and heated under an atmosphere of nitrogen at 170–180° C. for five hours to produce 3β - hydroxy - 5 - androsteno [16,17-c][1',2',5']oxadiazole, which is conveniently isolated by acidifying the reaction mixture (after cooling) and filtering the resultant precipitate. Purification is effected by crystallization from methanol.

The requisite intermediates for the process aspect of this invention are the 16,17-bis-oximino derivatives of steroids of the androstane and estrane series. Of these, some are known, e.g. 16,17-bis-oximino-1,3,5(10)-estratrien-3-ol and the 3-methyl ether thereof. Those which are not readily available may be derived from the corresponding 16-oximino-17-keto steroid by reaction thereof with hydroxylamine according to procedures known in the art. Thus, for example, 16-oximino-5-androsten-3β-ol-17-one, upon reaction with hydroxylamine in pyridine yields 16,17-dioximino-5-androsten-3β-ol.

The intermediary 16,17-bis-oximino-steroids of the androstane and estrane series have preferably a 3-hydroxy or a 3-alkoxy group at C–3, although 3-acyloxy derivatives may also be utilized. Some typical 16,17-bis-oximino starting steroids are as follows:

16,17-bis-oximino-androstan-3β-ol,
16,17-bis-oximino-androstane-3β,11β-diol,
16,17-bis-oximino-19-nor-5-androsten-3β-ol,
16,17-bis-oximino-1,3,5(10)-estratrien-3-ol 3-methyl ether,
16,17-bis-oximino-1,3,5(10)-estratrien-3-ol 3-ethyl ether,
1-methyl-16,17-bis-oximino-1,3,5(10)-estratrien-3-ol,
16,17-bis-oximino-1,3,5(10),7-estratetraen-3-ol,
16,17-bis-oximino-1,3,5(10),6,8-estrapentaen-3-ol,
17,17a-bis-oximino-D-homo-1,3,5(10)-estratrien-3-ol,
17,17a-bis-oximino-D-homo-androstan-3β-ol,
16,17-bis-oximino-5-androstene-3β,11β-diol,
3β-acetoxy-16,17-bis-oximino-5-androstene,
16,17-bis-oximino-1,3,5(10)-estratrien-3-ol, and
16,17-bis-oximino-19-nor-5α-androstan-3β-ol.

In general, when preparing compounds of my invention, it is preferable to introduce ester groups (such as at C–3) after introduction of the furoxan ring at C–16 and C–17 (or at C–17 and C–17a of the D-homo steroids), since, when the oxidation step of my process is carried out in a basic medium, e.g. with sodium hypohalite in the presence of sodium hydroxide, any ester groups present in the starting steroid such as at C–3 are hydrolyzed. Such groups may then be reesterified according to procedures well known in the art. Thus, 3β-acetoxy-16,17-bis-oximino-5-androstene upon reaction with sodium hypochlorite in the presence of sodium hydroxide yields 3β-hydroxy-5-androsteno[16,17-c][1',2',5']oxadiazole-N-oxide. Esterification of the foregoing N-oxide with acetic anhydride in pyridine yields 3β-acetoxy-5-androsteno[16,17-c][1',2',5']oxadiazole - N - oxide which upon treatment with triethylphosphite according to my invention yields 3β-acetoxy - 5 - androsteno[16,17-c][1',2',5']oxadiazole.

The 3-keto function is conveniently introduced into the molecule after preparation of my furoxan (i.e. N-oxide-oxadiazoles) derivatives by utilizing conventional oxidative techniques. For example, 3β-hydroxy-5-androsteno [16,17-c][1',2',5']oxadiazole-N-oxide (prepared according to the preferred embodiment of my process as described hereinabove) upon reaction with chromic/sulfuric acid reagent in acetone (i.e. Jones reagent) yields the corresponding 3-keto derivative, i.e. 3-keto-5-androsteno [16,17-c][1',2',5']oxadiazole - N - oxide which, in turn, upon treatment with alcoholic sodium hydroxide may be isomerized to the corresponding Δ⁴-analog, i.e. 3-keto-4-androsteno[16,17-c][1',2',5']oxadiazole-N - oxide. Alternatively, the latter 3-keto-Δ⁴ compound may be derived in one step from the aforementioned 3-hydroxy-Δ⁵-precursor according to known techniques such as that utilizing the microorganism *Flavobacterium dehydrogenans*, or via chemical means such as an Oppenauer oxidation utilizing aluminum isopropoxide in acetone.

The 3-keto-1,4-androstadieno and the 3-keto-4,6-androstadieno-furoxans (i.e. the Δ¹,⁴- and Δ⁴,⁶-N-oxido derivatives of Formula I wherein W is oxygen) are preferably obtained by dehydrogenation of the corresponding 3-keto-4-androsteno-furoxans via chemical procedures. Thus, 3-keto-4-androsteno[16,17-c][1',2',5']oxadiazole - N - oxide upon treatment with dichlorodicyanobenzoquinone in dioxane yields 3-keto-1,4-androstadieno[16,17-c][1',2',5'] oxadiazole-N-oxide which in turn, upon treatment with triethylphosphite according to the process of my invention yields 3-keto - 1,4 - androstadieno[16,17-c][1',2',5'] oxadiazole (i.e. a Δ¹,⁴-derivative of Formula I wherein W is oxygen). Similarly, treatment of 3-keto-4-androsteno [16,17-c][1',2',5']oxadiazole - N - oxide with dichlorodicyanobenzoquinone in the presence of hydrogen chloride yields the Δ⁶-analog, i.e. 3-keto-4,6-androstadieno[16, 17-c][1',2',5']oxadiazole-N-oxide which upon treatment with triethylphosphite yields 3-keto-4,6-androstadieno[16, 17-c][1',2',5']oxadiazole (a Δ⁴,⁶-compound of Formula I wherein W is oxygen). Similarly, treatment of the foregoing 3-keto-4,6-androstadieno-furoxan with dichlorodicyanobenzoquinone yields the Δ¹-analog thereof, i.e. 3-keto-1,4,6 - androstatrieno[16,17-c][1',2',5']oxadiazole-N-oxide( an N - oxide - Δ¹,⁴,⁶ - compound of Formula I wherein W is oxygen) which upon treatment with triethylphosphite yields 3-keto - 1,4,6 - androstatrieno[16,17-c] [1',2',5']oxadiazole.

In general, when derivatives of Formula I having substituents at C–6, C–9 and C–11 are desired, it is preferable that they be present in the molecule prior to introduction of the oxadiazole nucleus at C–16 and C–17, although they may be introduced conveniently into the steroidal furoxans of my invention prior to reduction thereof with triethylphosphite to the furazans of my invention. It is also possible, though not as desirable, to introduce substituents at C–6, 9, and 11 for example, into the furazans of Formulae I and II.

For example, a convenient method of preparing a 9α,11β-halohydrin derivative of Formula I, e.g. 9α-fluoro-11β - hydroxy - 3 - keto-4-androsteno[16,17-c][1,2',5]-oxadiazole, utilizes as a starting intermediate, 16,17-bis-oximino - 5 - androstene-3β,11β-diol which, upon reaction with sodium hypochlorite according to my invention yields 3β,11β - dihydroxy-5-androsteno-[16,17-c][1',2',5']oxadiazole-N-oxide (an 11β-hydroxy-N-oxido-Δ⁵-derivative of Formula I wherein W is (H,βOH)) which in turn, upon reaction with aluminum isopropoxide in acetone according to known techniques will yield the corresponding 3-keto - Δ⁴ - analog thereof, i.e. 3-keto-11β-hydroxy-4-androsteno[16,17-c][1',2',5']oxadiazole - N - oxide. Treatment of the foregoing compound with methanesulfonylchloride in dimethylformamide effects dehydration at C–9 and C–11 to yield 3-keto-4,9(11)-androstadieno[16,17-c]-[1',2',5']oxadiazole-N-oxide which, when reacted with N-bromoacetamide and perchloric acid in aqueous dioxane yields the 9α-bromo-11β-hydroxy derivative, i.e. 3-keto-9α-bromo - 11β - hydroxy - 4-androsteno[16,17-c][1',2'5']-oxadiazole-N-oxide. Reaction of the foregoing 9α,11β-bromohydrin with potassium acetate in acetone in known manner effects dehydrobromination to give the 9β,11β-oxido derivative. Addition of anhydrous hydrogen fluoride or hydrogen chloride thereto yields the corresponding 9α,-11β-halogenohydrin, i.e. 3-keto-9α-chloro-11β-hydroxy-4-androsteno[16,17-c][1',2',5']oxadiazole-N-oxide and 3-keto - 9α - fluoro - 11β-hydroxy-4-androsteno[16,17-c]-[1',2',5']oxadiazole-N-oxide. Reduction of each of the foregoing with triethylphosphite according to my invention, yields the corresponding furoxans, i.e. 3-keto-9α-chloro - 11β - hydroxy - 4-androsteno[16,17-c][1',2',5']-oxadiazole and 3 - keto - 9α-fluoro-11β-hydroxy-4-androsteno[16,17-c][1',2',5']oxadiazole, respectively (both of which are 9α-halogeno-11β-hydroxy derivatives of Δ⁴-compounds of Formula I wherein W is oxygen).

The tangible embodiments of the composition aspect of my invention possess therapeutic activity as evidenced by pharmacological tests in animals. For example, a preferred species of my invention, i.e. 3-methoxy-1,3,5(10)-estratrieno[16,17-c][1',2',5']oxadiazole-N-oxide exhibits marked estrogenic activity in the General Hormone Screen when administered subcutaneously in the rat and when tested for anti-atherosclerosis activity via the oral route in rats. In general, the 1,3,5(10) - estratrieno[16,17-c]-

[1',2',5']oxadiazoles defined by Formula II and the N-oxide derivatives thereof exhibit estrogenic activity and are useful for the treatment of disorders requiring an estrogenic agent and may be administered in similar manner as are known estrogenic agents, the dosage utilized being dependent on the nature and severity of the illness.

The 3 - keto-androstano and 3 - hydroxy- androstano-[17,16-c][1',3',5']oxadiazole derivatives of Formula I (i.e. R is methyl), and the corresponding estrane analogs (i.e. R is hydrogen), and the unsaturated analogs thereof, as well as the N-oxide derivatives of the foregoing possess anabolic/androgenic activity. For example, 3-keto-4-androsteno[16,17-c][1',2',5]oxadiazole-N-oxide and 3 - hydroxy-5-androsteno[16,17-c][1',2',5'] oxadiazole-N-oxide (N-oxide derivatives of Formula I and members of the preferred species of my invention) exhibit anabolic/androgenic activity when tested in the rat via the subcutaneous route in the General Hormone Screen. The compounds of Formula I are, therefore, useful in the treatment of ailments caused by poor utilization of nitrogen and may be administered in a manner similar to that used for known anabolic/androgenic agents, the dose required depending on the nature and severity of the illness being treated.

The physiologically active compounds of this invention, e.g. 3 - methoxy-1,3,5(10)-estratrieno[16,17-c][1',2',5']-oxadiazole-N-oxide, 3 - keto - 4 - androsteno[16,17-c]-[1',2',5']oxadiazole-N-oxide and 3β - hydroxy - 5-androsteno[16,17-c][1',2',5']oxadiazole-N-oxide thus may be administered orally or parenterally by incorporating a therapeutic dosage in conventional pharmaceutical form such as tablets, capsules, elixirs, suspension, solution, or the like. They can be administered in admixture with pharmaceutical excipients which are edible and which are chemically inert to the aforementioned [16,17-c][1',2',5']-oxadiazole-N-oxides, exemplified by cornstarch, lactose, sucrose, gum arabic usually in admixture with an additive such as magnesium stearate, talc, and the like. Other compositions may be used such as fine powders or granules of 3 - methoxy-1,3,5(10)-estratrieno[16,17-c]-[1',2',5']oxadiazole-N-oxide - 3 - keto - 4 - androsteno-[16,17-c][1',2',5']oxadiazole-N-oxide and 3β - hydroxy-[16,17-c][1',2',5']oxadiazole-N-oxide or derivatives thereof, which compositions may contain diluents and dispersing and surface acitve agents and may be presented in a syrup or non-aqueous suspensions, in aqueous suspension, or in an oil.

For purposes of illustration, the preferred mode of carrying out the process of this invention is disclosed in detail below. It will be readily apparent to one skilled in the art that there are alternative ways in which derivatives of the base compounds of my invention (as defined by Formulae I and II) may be obtained. It is to be understood that the examples are merely illustrative of the process and are not to be construed as limiting the invention. Obvious equivalents apparent to one skilled in the art are included in the invention as defined by the appended claims.

EXAMPLE 1

16-oximino-5-androsten-3β-ol-17-one

To a solution of 2.1 g. of potassium in 150 ml. of anhydrous t-butanol add 5 g. if 5-androsten-3β-ol-17-one. Stir the mixture under nitrogen for 30 minutes, then add dropwise 4 ml. of n-butyl nitrite and continue stirring the reaction mixture at room temperature for one hour. Add 150 ml. of cold water and acidify the resulting solution by first adding acetic acid and then hydrochloric acid. Filter the resultant precipitate, wash the residue with water and dry to give 16-oximino-5-androsten-3β-ol-17-one. Purify by crystallization from acetone-hexane M.P. 239–241° C.

In a manner similar to that described above, treat each of the following 16-unsubstituted 17-keto steroids with n-butyl nitrite and potassium t-butoxide:

Androstan-3β-ol-17-one,
Androstane-3β,11β-diol-17-one,
19-nor-5-androsten-3β-ol-17-one,
1,3,5(10)-estratrien-3-ol-17-one 3-methyl ether (estrone 3-methyl ether),
1-methyl-estrone,
7-dehydro-estrone (equilin),
1,3,5(10)-6,8-estrapentaen-3-ol-17-one (equilenin),
D-homoandrostan-3β-ol-17a-one,
5-androstene-3β,11β-diol-17-one,
19-nor-5α-androstan-3β-ol-17-one,
D-homo-1,3,5(10)-estratrien-3-ol-17a-one,
D-homo-5-androsten-3-ol-17a-one.

Isolate and purify the respective resultant products in a manner similar to that described above to obtain the following products 1A through 1L, respectively:

(1A) 16-oximino-androstan-3β-ol-17-one,
(1B) 16-oximino-androstane-3β,11β-diol-17-one,
(1C) 16-oximino-19-nor-5-androsten-3β-ol-17-one,
(1D) 16-oximinoestrone 3-methyl ether,
(1E) 16-oximino-1-methylestrone,
(1F) 16-oximinoequilin,
(1G) 16-oximinoequilenin,
(1H) 17-oximino-D-homoandrostan-3β-ol-17a-one,
(1I) 16-oximino-5-androstene-3β,11β-diol-17-one,
(1J) 16-oximino-19-nor-5α-androstan-3β-ol-17-one,
(1K) 17-oximino-D-homo,1,3,5(10)-estratrien-3-ol-17a-one,
(1L) 17-oximino-D-homo-5-androsten-3β-ol-17a-one.

EXAMPLE 2

16,17-bis-oximino-5-androsten-3β-ol

To a solution of 3.5 g. of 16-oximino-5-androsten-3β-ol-17-one in 75 ml. of pyridine add 3.5 g. of hydroxylamine hydrochloride and keep the reaction mixture at room temperature overnight. Then pour into ice water. Filter the resultant precipitate and wash the residue with water and dry to give 16,17-bis-oximino-5-androsten-3β-ol. Purify by crystallization from methanol M.P. 262–263° C. dec.

In a similar manner treat each of compounds 1A through 1L (prepared as described in Example 1) with hydroxylamine hydrochloride. Isolate and purify the resultant respective products to obtain (2A) 16,17-bis-oximinoandrostan-3β-ol,
(2B) 16,17-bis-oximinoandrostane-3β,11β-diol,
(2C) 16,17-bis-oximino-19-nor-5-androsten-3β-ol,
(2D) 16-ketoestrone 3-methyl ether-16,17-bis-oxime,
(2E) 1-methyl-16-ketoestrone-16,17-bis-oxime,
(2F) 16-ketoequilin-16,17-bis-oxime,
(2G) 16-ketoequilenin-16,17-bis-oxime,
(2H) 17,17a-bis-oximino-D-homo-androstan-3β-ol,
(2I) 16,17-bis-oximino-5-androstene-3β,11β-diol,
(2J) 16,17-bis-oximino-19-nor-5α-androstan-3β-ol,
(2K) 17,17a-bis-oximino-D-homo-1,3,5(10)-estratrien-3-ol,
(2L) 17,17a-bis-oximino-D-homo-5-androsten-3β-ol.

EXAMPLE 3

3β-hydroxy-5-androsteno[16,17-c][1',2',5']oxadiazole-N-oxides(3β-hydroxy-5-androsteno[16,17-c]furoxan)

(A) Prepare a solution of sodium hypochlorite by bubbling chlorine gas into a 1.0 N sodium hydroxide solution which is chilled in an ice bath. Continue adding the chlorine gas until the solution is no longer alkaline.

Add 2 g. of 16,17-bis-oximino-5-androsten-3β-ol to a mixture of 88 ml. of 10% sodium hydroxide, 160 ml. of water and 40 ml. of ethanol. Chill the reaction mixture in an ice bath, then add dropwise while stirring the reaction mixture, 312 ml. of freshly prepared sodium hypochlorite solution. Stir the chilled reaction mixture for 2 hours, then keep it at 5° C. overnight. Filter the resultant precipitate, wash with water and dry to give 3β-hydroxy-5-androsteno[16,17-c]furoxan having a M.P.=172–175° C. Purify by crystallization from acetonehexane M.P. 178–179° C., [α]$_D$–101° (dioxan), $\lambda_{max.}^{methanol}$ 259 mμ (ε 5,810)

The 3β-hydroxy-5-androstene [16,17-c] furoxan thus obtained is a mixture of the two possible N-oxides (i.e. the 2′- and 5′- N-oxides) as determined by nuclear magnetic resonance (NMR) spectral data.

(B) Cool in a cold water bath a solution of 75 mg. of 16,17-bis-oximino-5-androsten-3β-ol in 8 ml. of acetic acid, then add a solution of 1 g. of sodium nitrite in 1 ml. of water. Keep the reaction mixture at room temperature for 15 minutes, then pour into ice water. Filter the resultant precipitate, then dissolve the filter residue in 2 ml. of acetone and add 2 drops of 6 N hydrochloric acid. Allow this mixture to stand for 45 minutes (to hydrolyze any 3-nitrite ester which may be present). Pour the solution into ice water, filter the resultant precipitate and wash the filtered residue with water and dry to give 3β-hydroxy-5-androsteno[16,17-c]furoxan.

In a similar manner, utilizing either of above procedures A and B, each of the 16,17-bis-oximino derivatives 2A through 2L (prepared as described in Example 2) is converted to the following respective furoxan derivative.

(3A) 3β-hydroxyandrostano[16,17-c]furoxan,
(3B) 3β,11β-dihydroxyandrostano[16,17-c]furoxan,
(3C) 3β-hydroxy-19-nor-5-androsteno[16,17-c]furoxan,
(3D) 3-methoxy-1,3,5(10)-estratrieno[16,17-c]furoxan,
(3E) 1-methyl-3-hydroxy-1,3,5(10)-estratrieno[16,17-c]furoxan,
(3F) 3-hydroxy-1,3,5(10),7-estratetraeno[16,17-c]furoxan,
(3G) 3-hydroxy-1,3,5(10),6,8-estrapentaeno[16,17-c]furoxan,
(3H) 3β-hydroxy-D-homoandrostano[17,17a-c]furoxan,
(3I) 3β,11β-dihydroxy-5-androsteno[16,17-c]furoxan,
(3J) 3β-hydroxy-19-nor-5α-androstano[16,17-c]furoxan,
(3K) 3-hydroxy-D-homo-1,3,5(10)-estratrieno-[17,17a-c)]furoxan,
(3L) 3β-hydroxy-D-homo-5-androsteno[17,17a-c)] furoxan.

EXAMPLE 4

3-keto-5-androsteno[16,17-c]furoxan

To a solution of 100 mg. of 3β-hydroxy-5-androsteno [16,17-c]furoxan in 10 ml. of acetone, cooled in an ice bath, add dropwise while stirring the reaction mixture a solution of chromium trioxide in aqueous surfuric acid (Jones reagent) until a permanent orange color is obtained. Add a few drops of methanol, then pour the resulting green solution into ice water. Filter the resultant precipitate and wash the filtered residue with water, then dry to give 3-keto-5-androsteno[16,17-c]furoxan $\lambda_{max.}^{methanol}$ 258 mμ (ε 6,250)

Purify by crystallization from acetone-hexane.

In similar manner treat each of the 3β-hydroxy-furoxan derivatives prepared in Example 3, i.e. compounds 3A, 3B, 3C, 3H, 3I, 3J and 3L with chromium trioxide in sulfuric acid in the manner described above. Isolate and purify the resultant products in a manner similar to that described to give, respectively (4A) 3-ketoandrostano[16,17-c]furoxan,
(4B) 3,11-diketoandrostano[16,17-c]furoxan,
(4C) 3-keto-19-nor-5-androsteno[16,17-c]furoxan,
(4H) 3-keto-D-homoandrostano[17,17a-c]furoxan,
(4I) 3,11-diketo-5-androsteno[16,17-c]furoxan,
(4J) 3-keto-19-nor-5α-androstano[16,17-c]furoxan,
(4L) 3-keto-D-homo-5-androsteno[17,17a-c]furoxan.

EXAMPLE 5

3-keto-4-androsteno[16,17-c]furoxan

Dissolve 80 mg. of 3-keto-5-androsteno[16,17-c]furoxan in about 10 ml. of hot methanol, then add sufficient 10% sodium hydroxide solution to adjust the solution pH between 8 and 9. Heat the solution on a steam bath for 5 minutes, then bring to neutrality by the addition of acetic acid, then concentrate to a small volume. Pour the reaction mixture into ice water and filter the resultant precipitate. Wash the filtered residue with water and dry to give 3-keto-4-androsteno[16,17-c]furoxan. Purify by crystallization from acetone-hexane M.P. 211–213° C. [α]$_D$+31° (dioxan), $\lambda_{max.}^{methanol}$ 239 mμ (ε 20,000)

In a similar manner treat each of 3-keto-19-nor-5-androsteno[16,17-c]furoxan (product 4C) and 3,11-diketo-5-androsteno[16,17-c]furoxan (product 4I) and 3-keto-D-homo - 5 - androsteno[17,17a-c]furoxan (product 4C) with sodium hydroxide in methanol and isolate and purify the resultant product to obtain, respectively 3-keto-19-nor-4-androsteno[16,17-c]furoxan (product 5C), and
3,11-diketo-4-androsteno[16,17-c]furoxan (product 5I), and
3-keto-D-homo-4-androsteno[17,17a-c]furoxan (product 5L).

EXAMPLE 6

3-keto-4,6-androstadieno[16,17-c]furoxan

Cool a solution of 1.0 g. of 3-keto-4-androsteno [16,17-c]furoxan and 750 mg. of dichlorodicyanobenzoquinone in 50 ml. of dioxane in a water bath and pass a stream of anhydrous hydrogen chloride gas through the solution for one minute. Stir this reaction mixture at room temperature for one hour, then filter off the precipitated hydroquinone. Add ethyl acetate to the filtrate and extract the ethyl acetate solution with 2% aqueous sodium hydroxide, then wash with saturated sodium chloride solution and concentrate in vacuo to a residue comprising 3-keto-4,6-androstadieno[16,17-c]furoxan.

In similar manner treat 3,11-diketo-4-androsteno [16,17-c]furoxan with dichlorodicyanobenzoquinone and hydrogen chloride. Isolate and purify the resultant product in the manner described to give 3,11-diketo-4,6-androstadieno[16,17-c]furoxan.

EXAMPLE 7

3-keto-1,4-androstadieno[16,17-c]furoxan

To a solution of 750 mg. of dichlorodicyanobenzoquinone in 100 ml. of dioxane add 1 g. of 3-keto-4-androsteno[16,17-c]furoxan (compound 5C). Heat the reaction solution at reflux temperature for 16 hours, then concentrate to a residue of about 30 ml., filter, and add ethyl acetate to the filtrate. Extract the ethyl acetate solution with 2% aqueous sodium hydroxide, then wash with water, dry over sodium sulfate and concentrate in vacuo to a residue comprising 3-keto-1,4-androstadieno[16,17-c] furoxan. Purify by crystallization from acetone-hexane.

In a similar manner treat each of 3,11-diketo-4-androsteno[16,17-c]furoxan (compound 5I) and 3-keto-4,6-androstadieno[16,17-c]furoxan (compound of Example 6) with dichlorodicyanobenzoquinone at reflux temperature and isolate and purify the resultant product in a manner similar to that described above to obtain 3,11-diketo - 1,4 - androstadieno[16,17-c]furoxan and 3-keto-1,4,6-androstatrieno[16,17-c]furoxan, respectively.

EXAMPLE 8

3-keto-9α-halogeno-11β-hydroxy-4-androsteno[16,17-c]furoxan (A) 3-keto-11β-hydroxy-4-androsteno[16,17-c]furoxan.—To a solution of 5 g. of aluminum isopropoxide in 200 ml. of dry benzene add dropwise with stirring a solution of 2 g. of 3β,11β-dihydroxy-5-androsteno-[16,17-c]furoxan in 60 ml. of of acetone. Heat the reaction mixture at reflux temperature for 16 hours, cool and dilute with ether. Wash the ether solution with a concentrated aqueous solution of potassium sodium tartrate, then wash with dilute aqueous sodium carbonate and finally with water. Dry the ether solution over sodium sulfate and then concentrate in vacuo to a residue comprising 3-keto-11β-hydroxy-4-androsteno[16,17-c]furoxan. Purify by crystallization from acetone-hexane.

(B) 3-keto-4,9(11)-androstadieno[16,17-c]furoxan. — Heat a solution of 1.0 g. of 3-keto-11β-hydroxy-4-androsteno[16,17-c]furoxan in a mixture of 5 ml. of pyridine and 5 ml. of dimethylformamide to 80° C., then add 0.9 ml. of methanesulfonyl chloride. Maintain the reaction mixture at 80° C. for one hour, then pour into ice water with stirring. Filter the resultant precipitate comprising the 3-keto-4,9(11)-androstadieno[16,17-c]furoxan, wash with water and dry. Purify by dissolving the precipitate in acetone and treating the acetone solution with decolorizing charcoal followed by crystallization from acetone-hexane.

(C) 3-keto-9α-bromo-11β-hydroxy-4-androsteno[16,17-c]furoxan.—To a solution of 500 mg. of 3-keto-4,9(11)-androstadieno-[16,17-c]furoxan in 60 ml. of dioxane and 6 ml. of water add 210 mg. of N-bromo acetamide and 3 ml. of 1.5 normal perchloric acid. Allow the mixture to stand at room temperature for 2 hours then add methylene chloride and wash the reaction mixture with a 5% sodium sulfite aqueous solution. Dry the methylene chloride solution over sodium sulfate, filter and evaporate the filtrate in vacuo to a residue comprising 3-keto-9α-bromo-11β-hydroxy-4-androsteno[16,17-c]furoxan. Purity by crystallization from acetone-hexane.

(D) 3-keto-9β,11β-oxido-4-androsteno[16,17-c]furoxan.—Add 2 g. of potassium acetate to a solution of 1 g. of 3-keto-9α-bromo-11β-hydroxy-4-androsteno[16,17-c]furoxan in 200 ml. of acetone. Heat the reaction mixture at reflux temperature for 6 hours then distill the acetone until the reaction mixture is reduced to a volume of about 20 ml. Pour the reaction mixture into ice water and filter the resultant precipitate comprising 3-keto-9β,11β-oxido-4-androsteno-[16,17-c]furoxan. Purify by crystallization from acetone-hexane.

(E) 3-keto-9α-fluoro-11β-hydroxy-4-androsteno[16,17-c]furoxan.—Add 1 g. of 3-keto-9β,11β-oxido-4-androsteno[16,17-c]-furoxan to a solution of 3.5 g. of hydrogen fluoride in 20 ml. of chloroform and 0.6 ml. of tetrahydrofurane maintained at $-10°$ C. Allow the reaction mixture to stand at $-10°$ C. for 3 hours then pour into aqueous sodium carbonate solution with stirring. Add chloroform, separate the organic and aqueous layers and evaporate the organic layer to a residue comprising 3-keto-9α-fluoro-11β-hydroxy 4-androsteno[16,17-c]furoxan (i.e. 3-keto-9α-fluoro-11β-hydroxy-4-androsteno[16,17-c][1′,2′,5′]oxadiazole-N-oxide). Purify by crystallization from acetone.

(F) 3-keto-9α-chloro-11β-hydroxy-4-androsteno[16,17-c]furoxan.—Bubble hydrogen chloride gas through a solution of 1 g. of 3-keto-9β,11β-oxido-4-androsteno[16,17-c]furoxan in 30 ml. of chloroform at 0° C. until the solution is saturated with hydrogen chloride. Keep the mixture at 0° C. for 6 hours then pass a stream of nitrogen through the solution to remove excess hydrogen chloride and then distill the reaction mixture to a small volume. Crystallize the resultant residue from acetone to yield 3-keto-9α-chloro-11β-hydroxy-4-androsteno[16,17-c]furoxan.

EXAMPLE 9

3β-acetoxy-androstano[16,17-c]furoxan (A) To a solution of 1 g. of 3β-hydroxy-androstano[16,17-c]-furoxan in 10 ml. of pyridine add 1 ml. of acetic anhydride. Allow the reaction mixture to stand at room temperature for 16 hours then pour into ice water. Filter the resultant precipitate, wash with water and dry to give 3β-acetoxy-androstano[16,17-c]-furoxan (i.e. 3β-acetoxy-androstano[16,17-c][1′,2′,5]oxadiazole-N-oxide.

(B) In the above procedure by substituting for acetic anhydride other acid anhydrides or halides such as propionic anhydride, caproyl chloride and benzoyl chloride, there is obtained the corresponding ester at C–3, i.e. 3β-propionyloxy-androstano[16,17-c]furoxan, 3β-caproyloxy-androstano[16,17-c]-furoxan and 3β-benzoyloxy-androstano[16,17-c]furoxan, respectively.

(C) In a similar manner react each of the following furoxans with acetic anhydride in pyridine according to the procedure of Example 9–A.

3β-hydroxy-19-nor-5-androsteno[16,17-c]furoxan,
3-hydroxy-1,3,5(10)-estratrieno[16,17-c]furoxan,
1-methyl-3-hydroxy-1,3,5(10)-estratrieno[16,17-c]furoxan,
3-hydroxy-1,3,5(10),1-estratetraeno[16,17-c]furoxan,
3-hydroxy-1,3,5(10),6,8-estrapentaeno[16,17-c]furoxan,
3β-hydroxy-D-homo-androstano[17,17a-c]furoxan,
3β-hydroxy-19-nor-androstano[16,17-c]furoxan,
3-hydroxy-D-homo-1,3,5(10)-estratrieno[17,17a-c]furoxan, and
3β-hydroxy-5-androsteno[16,17-c]furoxan.

Isolate and purify the respective resultant products in a manner described in Example 9–A to obtain respectively, 3β-acetoxy-19-nor-5-androsteno[16,17-c]furoxan,
3-acetoxy-1,3,5(10)-estratrieno[16,17-c]furoxan,
1-methyl-3-acetoxy-1,3,5(10)-estratrieno[16,17-c]furoxan,
3-acetoxy-1,3,5(10),7-estratetraeno[16,17-c]furoxan,
3-acetoxy-1,3,5(10),6,8-estrapentaeno[16,17-c]furoxan,
3β-acetoxy-D-homo-androstano[17,17a-c]furoxan,
3β-acetoxy-19-nor-androstano[16,17-c]furoxan,
3-acetoxy-D-homo-1,3,5(10)-estratrieno[17,17a-c]furoxan, and
3β-acetoxy-5-androsteno[16,17-c]furoxan.

EXAMPLE 10

3-keto-4-androsteno[16,17-c][1′,2′,5′]oxadiazole
(3-keto-4-androsteno[16,17-c]furazan Heat a suspension of 500 mg. of 3-keto-4-androsteno[16,17-c]-furoxan in 3 ml. of triethyl phosphite at 170–180° C. under an atmosphere of nitrogen for 5 hours. Cool the reaction mixture then add 3 ml. of water and 6 ml. of 10% aqueous sulfuric acid. Separate the resultant precipitate by filtration, wash with water and dry to give 3-keto-4-androsteno[16,17-c]furazan. Purify by crystallization from methanol.

Treat each of the following [16,17-c][1′,2′,5′] oxadiazole-N-oxide derivatives with triethyl phosphite in a manner similar to that described above and isolate and purify the resultant product in the manner described to give the respective [16,17-c]furazan products listed below:

| Starting material | Product |
|---|---|
| 3β,11β-dihydroxy-5-androsteno-[16,17-c]furoxan. | 3β,11β-dihydroxy-5-androsteno-[16,17-c]furazan. |
| 3β-hydroxy-19-nor-5α-androstano-[16,17-c]furoxan. | 3β-hydroxy-19-nor-5α-androstano-[16,17-c]furazan. |
| 3-hydroxy-D-homo-1,3,5(10)-estratrieno[17,17a-c]furoxan. | 3-hydroxy-D-homo-1,3,5(10)-estratrieno[17,17a-c]furazan. |
| 3β-hydroxy-D-homo-5-androsteno-[17,17a-c]furoxan. | 3β-hydroxy-D-homo-5-androsteno-[17,17a-c]furazan. |
| 3-ketoandrostano-[16,17-c]furoxan. | 3-ketoandrostano-[16,17-c]furazan. |
| 3,11-diketoandrostano-[16,17-c]furoxan. | 3,11-diketoandrostano-[16,17-c]furazan. |
| 3-keto-19-nor-5-androsteno-[16,17-c]furoxan. | 3-keto-19-nor-4-androsteno-[16,17-c]furazan. |
| 3-keto-D-homoandrostano-[17,17a-c]furoxan. | 3-keto-D-homoandrostano-[17,17a-c]furazan. |
| 3,11-diketo-5-androsteno-[16,17-c]furoxan. | 3,11-diketo-4-androsteno-[16,17-c]furazan. |
| 3-keto-19-nor-5α-androstano-[16,17-c]furoxan. | 3-keto-19-nor-5α-androstano-[16,17-c]furazan. |
| 3-keto-D-homo-5-androsteno-[17,17a-c]furoxan. | 3-keto-D-homo-4-androsteno-[17,17a-c]furazan. |
| 3-keto-19-nor-4-androsteno-[16,17-c]furoxan. | 3-keto-19-nor-4-androsteno-[16,17-c]furazan. |
| 3,11-diketo-4-androsteno-[16,17-c]furoxan. | 3,11-diketo-4-androsteno-[16,17-c]furazan. |
| 3-keto-D-homo-4-androsteno-[17,17a-c]furoxan. | 3-keto-D-homo-4-androsteno-[17,17a-c]furazan. |
| 3-keto-4,6-androstadieno-[16,17-c]furoxan. | 3-keto-4,6-androstadieno-[16,17-c]furazan. |
| 3-keto-1,4-androstadieno-[16,17-c]furoxan. | 3-keto-1,4-androstadieno-[16,17-c]furazan. |
| 3-keto-1,4,6-androstatrieno-[16,17-c]furoxan. | 3-keto-1,4,6-androstatrieno-[16,17-c]furazan. |
| 3-keto-9α-fluoro-11β-hydroxy-4-androsteno[16,17-c]furoxan. | 3-keto-9α-fluoro-11β-hydroxy-4-androsteno[16,17-c]furazan. |
| 3-keto-9α-chloro-11β-hydroxy-4-androsteno[16,17-c]furoxan. | 3-keto-9α-chloro-11β-hydroxy-4-androsteno[16,17-c]furazan. |
| 3-keto-9α-bromo-11β-hydroxy-4-androsteno[16,17-c]furoxan. | 3-keto-9α-bromo-11β-hydroxy-4-androsteno[16,17-c]furazan. |
| 3β-acetoxy-androstano-[16,17-c]furoxan. | 3β-acetoxy-androstano-[16,17-c]furazan. |
| 3-acetoxy-1,3,5(10)-estratrieno [16,17-c]furoxan. | 3-acetoxy-1,3,5(10)estratrieno [16,17-c]furazan. |

In the above procedue, when the starting furoxan includes a 3 - keto - 5 - dehydro-system, such as in 3-kto-19-nor-5-androsteno[16,17-c]furoxan, under the conditions of the reaction, isomerization to the 3 - keto - 4-dehydro-system occurs so that the resultant product consists predominantly of the isomerized structure, e.g. 3-keto-19-nor-4-androsteno[16,17-c]furazan.

I claim:
1. A compound selected from the group consisting of [16,17-c][1',2',5']oxadiazole derivatives of steroids of the androstane and estrane series having the following structural formulae I and II:

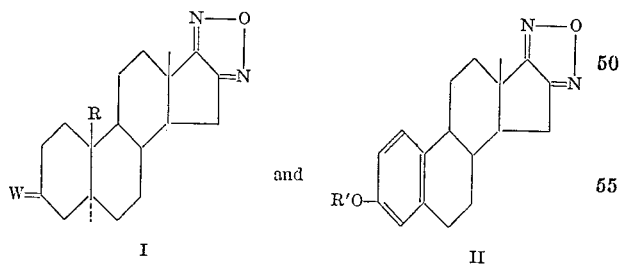

wherein R is a member selected from the group consisting of hydrogen and methyl; W is a member selected from the group cansisting of oxygen and (H,βOY), Y being a member selected from the group consisting of hydrogen and hydrocarbon carbonyl having up to eight carbon atoms; and R' is a member selected from the group consisting of hydrogen, lower alkyl, and hydrocarbon carbonyl having up to eight carbon atoms; and when W is oxygen, the 4-dehydro and 4,6-bis-dehydro-analogs of Formula I; and when W is oxygen and R is methyl, the 1,4-bis-dehydro- and the 1,4,6-tris-dehydro-analogs of Formula I; and when W is (H,βOY) the 5-dehydro-analogs of Formula I; and the [17,17a-c][1',2',5']D-homo-analogs of Formulae I and II and of the foregoing derivatives thereof; and the N-oxide derivatives of Formulae I and II and of the foregoing derivatives and homologs thereof.

2. A 4-dehydro-N-oxide derivative according to claim 1, Formula I wherein R is methyl and W is oxygen, said compound being 3-keto-4-androsteno [16,17-c][1',2',5'] oxadiazole-N-oxide.

3. An N-oxide derivative according to claim 1 Formula II wherein R' is methyl, said compound being 3-methoxy-1,3,5(10) - estratrieno[16,17-c][1',2',5']oxadiazole - N-oxide.

4. A 5-dehydro-N-oxide derivative according to claim 1, Formula I wherein R is methyl and W is (H,βOH), said compound being 3β-hydroxy-5-androsteno[16,17-c] [1',2',5']oxadiazole-N-oxide.

5. The process for preparing a [16,17-c][1',2',5'] oxadiazole-N-oxide derivative of a steroid selected from the group consisting of the androstane and estrane series which comprises treating a 16,17-bis-oximino derivative of a steroid selected from the group consisting of the androstane and estrane series with nitrous acid in situ.

6. The process according to claim 5 wherein the nitrous acid in situ is prepared by the action of sodium nitrite in acetic acid.

7. The process according to claim 5 wherein said 16,17-bis-oximino derivative is 3β-hydroxy-16,17-bis-oximino-5-androstene and wherein said nitrous acid in situ is generated by the action of sodium nitrite in acetic acid, said process comprising treating 3β-hydroxy-16,17-bis-oximino-5-androstene with sodium nitrite in acetic acid whereby is prepared 3β-hydroxy-5-androsteno[16,17-c] [1',2',5']oxadiazole-N-oxide.

8. The process according to claim 5 wherein said bis-oximino derivative is 3β-hydroxy-16,17-bis-oximino-1,3,5(10)-estratriene and wherein said nitrous acid in situ is generated by the action of sodium nitrite in acetic acid, said process comprising treating 3β-hydroxy-16,17-bis-oximino-1,3,5(10)-estratriene with sodium nitrite in acetic acid whereby is prepared 3β-hydroxy-1,3,5(10)-estratrieno[16,17-c][1',2',5']oxadiazole-N-oxide.

References Cited

Freytag et al., Methoden Der Organischen Chemie Stickstoffverbindungen II and III, 1958, Georg Thieme Verlag, Methoden zur Umwandlung von Aminen, pp. 1-221, p. 136 relied on.

Behr, L., Heterocyclic Compounds 1962, Wiley and Sons, New York, London, chapter XI, pp. 283-315, p. 299 relied on.

LEWIS GOTTS, Primary Examiner.

E. G. LOVE, Assistant Examiner.

U.S. Cl. X.R.

195—51; 260—307, 397.4, 397.5, 397.45, 566, 999

UNITED STATES PATENT OFFICE
CERTIFICATE OF CORRECTION

Patent No. 3,437,658 April 8, 1969

Hans Reimann

It is certified that error appears in the above identified patent and that said Letters Patent are hereby corrected as shown below:

Column 4, line 12, "e.g. sodium hypo-" should read -- e.g. calcium hypo- --. Column 12, line 33, "1,3,5(10),1-estratetraeno" should read -- 1,3,5(10),7-estratetraeno --. Column 13, at the beginning of the table before line 5, insert:

| Starting Material | Product |
|---|---|
| 3β-Hydroxyandrostano-[16,17-c]furoxan | 3β-Hydroxyandrostano-[16,17-c]furazan |
| 3β,11β-Dihydroxyandrostano-[16,17-c]furoxan | 3β,11β-Dihydroxyandrostano-[16,17-c]furazan |
| 3β-Hydroxy-19-nor-5-androsteno-[16,17-c]furoxan | 3β-Hydroxy-19-nor-5-androsteno-[16,17-c]furazan |
| 3-Methoxy-1,3,5(10)-estra-trieno-[16,17-c]furoxan | 3-Methoxy-1,3,5(10)-estra-trieno-[16,17-c]furazan |
| 1-Methyl-3-hydroxy-1,3,5(10)-estratrieno[16,17-c]furoxan | 1-Methyl-3-hydroxy-1,3,5(10)-estratrieno[16,17-c]furazan |
| 3-Hydroxy-1,3,5(10),7-estra-tetraeno[16,17-c]furoxan | 3-Hydroxy-1,3,5(10),7-estra-tetraeno[16,17-c]furazan |
| 3-Hydroxy-1,3,5(10),6,8-estra-pentaeno[16,17-c]furoxan | 3-Hydroxy-1,3,5(10),6,8-estra-pentaeno[16,17-c]furazan |
| 3β-Hydroxy-D-homoandrostano-[17,17a-c]furoxan | 3β-Hydroxy-D-homoandrostano-[17,17a-c]furazan |

Signed and sealed this 14th day of April 1970.

(SEAL)
Attest:

EDWARD M. FLETCHER, JR.
Attesting Officer

WILLIAM E. SCHUYLER, J
Commissioner of Patent